July 15, 1969   C. B. GENTRY   3,455,433
TRANSFER MECHANISM
Filed Nov. 29, 1967

INVENTOR.
CHARLES B. GENTRY
BY
ATTORNEYS

United States Patent Office 3,455,433
Patented July 15, 1969

3,455,433
TRANSFER MECHANISM
Charles B. Gentry, Grand Rapids, Mich., assignor to Granco Equipment, Inc., Grand Rapids, Mich., a corporation of Delaware
Filed Nov. 29, 1967, Ser. No. 686,647
Int. Cl. B65g 47/00, 25/04; F16h 21/50
U.S. Cl. 198—20     9 Claims

ABSTRACT OF THE DISCLOSURE

This disclosure relates to a transfer mechanism comcomprising a longitudinal contacting member reciprocal along its length, a lifting member which supports the contacting member and on which the contacting member reciprocates, the lifting member being rotatable about a central horizontal axis transverse to the longitudinal direction of the contacting member, means for reciprocating the longitudinal contacting member on the lifting member, and means for periodically raising one end of the lifting member. The transfer mechanism is used in transferring hot extruded products from a conveyor to a walking beam for further processing.

The longitudinal contacting member is a graphite bar having sloping sides, generally of trapezoidal shape in cross section, and that graphite bar is supported by a channel having upwardly and inwardly sloping sides generally conforming to the shape of the bar, at least at the bottom portion thereof.

The longitudinal contacting member contains roller members which are positioned in tracks of the lifting member. The longitudinal contacting member is reciprocated by a chain and sprocket wheel connection from a power shaft.

---

This invention relates to a transfer mechanism in which a longitudinal contacting member, reciprocal along its length is supported by a lifting member and provided with means for reciprocating the contacting member along its length and means for periodically raising an end of the lifting member, wherein the longitudinal contacting member comprises a bar having sloping side walls, which bar is positioned with a channel having upwardly and inwardly sloping side walls which contain the bar.

In another of its aspects, the invention relates to a transfer mechanism as has been hereinbefore described wherein roller bearings are employed between the longitudinal contacting member and the lifting member.

In still another of its aspects, the invention relates to a transfer mechanism as has been hereinbefore described wherein a chain and sprocket is employed in reciprocating the longitudinal member on the lifting member.

As metal products such as aluminum are extruded from an extrusion die, they are carried away from the die orifice on a roller or slat conveyor. Since the extruded products are hot and soft, it is necessary that they be removed from the conveyor belt system with a heat resistant structural contacting member which is softer than the hot aluminum to avoid scratching the extruded products. Conventionally, a transfer mechanism having a graphite bar contacting portions are employed to lift the extruded metal from the conveyor and transferring the same to a walking beam for cooling and further processing. This application deals with the devices for transferring hot extruded products from conveyors to walking beams or other similar processing equipment.

Transfer mechanisms are well-known and have been used widely for this purpose. One transfer unit employs the use of a graphite bar which is attached to a support. A tilting member provides caming surfaces on which the support slides and a rack and pinion is used to actuate reciprocation of the support on the tilting member. The pinion is mounted on a long shaft which actuates many transfer mechanisms. Due to unevenness of the floor and to bending of the long power shaft, close tolerances are difficult to maintain between the sliding surfaces of the support and tilting member. Frequently, a new system must be operated for some time to wear the various members into a proper alignment with each other.

I have now discovered an improved transfer mechanism which is easy to move and which can compensate for unevenness of the floor in a plant and/or bending of the long power shaft by employing a chain and sprocket and roller bearings between the support and reciprocable contact member.

By various aspects of this invention one or more of the following or other objects can be obtained.

It is an object of this invention to provide an improved transfer mechanism.

It is a further object of this invention to provide an improved graphite structure for use in transferring hot extruded products wherein the graphite structure is easily replaced when broken, and which graphite structure has enhanced impact resistance.

It is a further object of this invention to provide a less expensive transfer mechanism which does not require close tolerances and which transfer mechanism requires less power to operate and yet is more reliable in operation.

It is a further object of this invention to provide a transfer mechanism which can be actuated with less force and which is adapted to compensate for unevenness of a plant floor.

Other aspects, objects and the several advantages of this invention are apparent to one skilled in the art from a study of this disclosure, the drawings, and the appended claims.

According to the invention, there is provided a transfer mechanism having a longitudinal contacting member reciprocable along its length, a lifting member which supports the contacting member and on which the contacting member reciprocates, said lifting member being rotatable about a central horizontal axis transverse to the longitudinal direction of the contacting member, means for reciprocating the longitudinal contacting member on the lifting member and means for periodically raising one end of the lifting member. The transfer mechanism has an improved longitudinal contacting member structure comprising a graphite bar having inwardly sloping sides, a channel support for the graphite bar, the channel support having upwardly and inwardly sloping side flanges adjacent the bar generally conforming to the shape of the bar at least at the bottom portion thereof.

Also according to the invention, roller bearings are employed between the contacting member and the lifting member. A chain and sprocket is employed in actuating the reciprocal movement of the longitudinal contacting member on the lifting member.

The invention will now be described with reference to the accompanying drawings in which.

Figure 1:
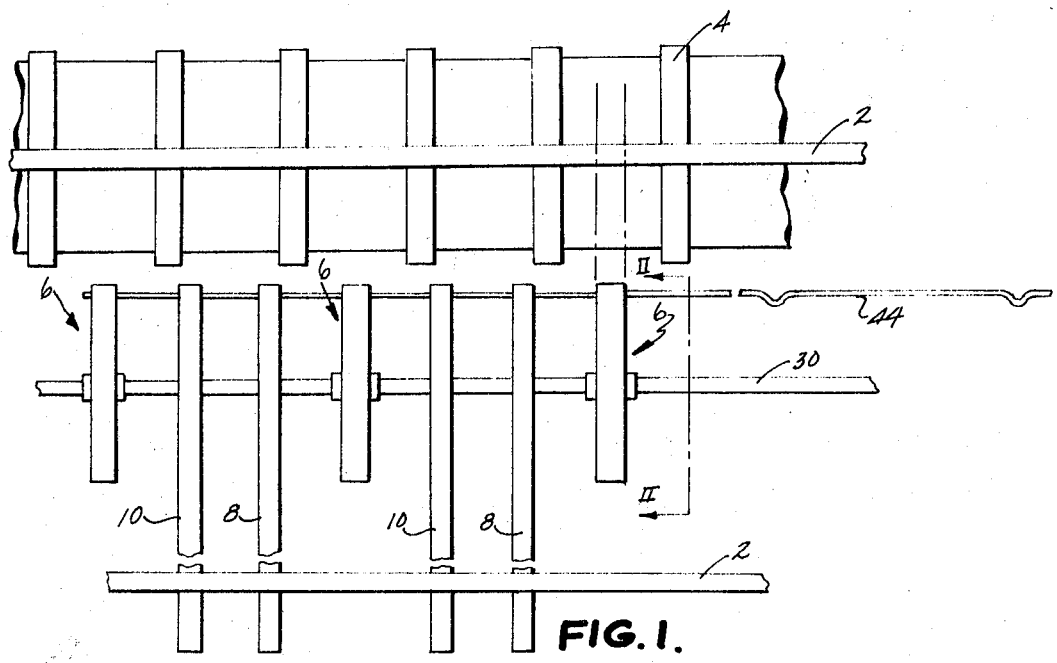
FIG. 1 is a plan view of a transfer mechanism according to the invention as shown in the environment with a conveyor and walking beam.

Referring now to the drawings, an extruded member 2 is carried along a conveyor belt comprising a plurality of conveyor slats 4 in the direction of the arrow shown in FIG. 1. Periodically, a transfer mechanism 6 is advanced to the position shown in the phantom lines beneath the extruded member 2 and between the conveyor slats 4. The contacting member of the transfer mechanism 6 is raised to lift the extruded member 2 up from the conveyor slats 4. The transfer mechanism is then withdrawn to the position shown in full lines in FIG. 1, and the contacting member of the transfer mechanism 6 is lowered to deposit the extruded members 2 on a walking beam comprising a movable member 8 and a stationary member 10. A walking beam can be any conventional type of walking beam which is well-known to those skilled in the art.

Figure 3:
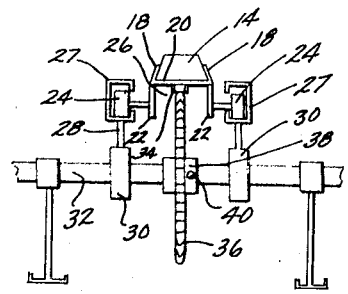
FIG. 3 is an end view of the transfer mechanism taken along line III—III of FIG. 2.
Figure 4:
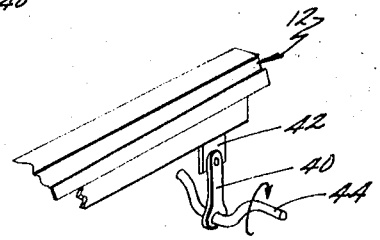
FIG. 4 is a perspective view of the lifting structure employed in the transfer mechanism.

The transfer mechanism 6 comprises a longitudinal contacting member 12 having a graphite bar 14 and a supporting channel 16. The graphite bar has upwardly and inwardly sloping sides as seen in FIG. 3 and is preferably of trapezoidal shape in cross section. The supporting channel has a bottom plate 20 and upwardly and inwardly directed side flanges 18 which have a slope approximately that of the sides of the graphite bar. Tabs 19 are attached to the side flanges 18 and bent around to the ends of the graphite bar 14 to restrain the same within the supporting channel 16.

The sloping side wall shape of the graphite bar permits the same to be easily replaced within the supporting channel 16 by simply bending the tabs 19 away from the end of the channel and sliding the bar out of the supporting channel 16. A new bar is then slid into the supporting channel 16 and the tabs are bent back in place.

The shape of the graphite bar further is advantageous in preventing breakage of the bars. Due to the fact that the extruded members 2 sometimes strike the bars with a certain amount of impact, breakage of the bars results. The construction of the longitudinal contacting member without the use of grooves or holes in the graphite bar 14 greatly enhances the impact resistance of the graphite bars. Further, the trapezoidal shape of the graphite bars is resistant to impact failure.

Figure 2:
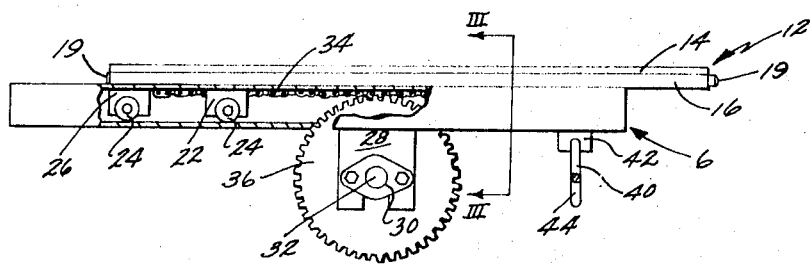
FIG. 2 is a side view of the transfer mechanism seen in FIG. 1 shown along lines II—II of FIG. 1, the view being partly in section.

The longitudinal contacting member 12 has downwardly extending flanges 22 and a bearing support bracket 26 to support roller bearings 24. The bearings can be positioned at the rearmost end of the longitudinal contacting member 12 as shown in FIG. 2. The roller bearings 24 are positioned in a pair of spaced opposing C-shaped channel rails 27 which comprise a portion of the lifting member. The channel rails 27 are affixed to a downwardly extending flange 28 having bearings 30 which surround a shaft 32. The bearings permit the lifting member to be supported by the shaft 32 and to be freely rotatable relative to shaft 32.

Attached to bottom plate 20 of supporting channel 16 is a chain 34. The chain 34 is preferably welded at either end to the bottom plate 20 to provide a certain degree of flexibility in the chain. A sprocket wheel 36 is attached to rotatable shaft 32 through a collar 38 and a set screw 40. The sprocket wheel 36 engages chain 34 to actuate the movement of longitudinal contacting member 12. Rotatable shaft 32 is connected to a conventional power source which rotates shaft 32 clockwise as seen in FIG. 2 a sufficient amount to move the contacting member to the position shown in phantom lines in FIG. 1. The power source also rotates the shaft back to the initial position shown in full lines in FIG. 1.

The sprocket wheel 38 and chain 34 provide a relatively flexible connection between the actuating means represented by a relatively fixed shaft 32 and the movable longitudinal contacting member 12. Because this flexible connection is employed, a relatively loose tolerance can be employed in the connecting member between the lifting member and the longitudinal contacting member. Therefore, the cheaper and more efficient roller bearings can be employed between the longitudinal contacting member 12 and the lifting member. Further, because the tolerances are not critical, less expensive roller bearings can be employed. Conversely, the use of the roller bearings between the longitudinal contacting member 12 and the lifting member enables the use of the less rigid and less expensive chain and sprocket. Also, because the contacting member 12 moves so easily on the lifting member, the long rotatable power shaft 32 requires less tongue and consequently develops less bending.

One end of the transfer mechanism 6 is periodically raised and lowered by a conventional crank shaft 44 which is attached to channel rails 27 through a flange 42 and a connecting rod 40.

Although the invention has been described with relation to a device in which roller bearings are attached to a contacting member and rails are attached to a lifting member, it is within the scope of the invention to provide roller bearings on the lifting member and rails on the contacting member.

Whereas the invention has been specifically described with relation to a device in which graphite slats are used, it is within the broader scope of the invention to employ slats made from other materials such as wood or high temperature synthetic materials.

Reasonable variation and modification are possible within the scope of the foregoing disclosure, drawings and the appended claims to the invention without departing from the spirit thereof.

I claim:

1. In a transfer mechanism for removing hot extruded products from a slatted conveyor comprising a longitudinal contacting member reciprocable along its length, said contacting member including an upper longitudinal work supporting refractory member adapted to support said extruded products, a lifting member which supports said contacting member and on which said contacting member reciprocates, said lifting member being rotatable about a horizontal axis transverse to the longitudinal direction of said contacting member, means for reciprocating said longitudinal contacting member on said lifting member, and means for periodically raising one end of said lifting member, the improvement which comprises:

said reciprocating means comprising a chain attached at end portions thereof to the bottom portion of said contacting member, disposed longitudinally thereof, a sprocket attached to a shaft which is rotatable in either direction about its longitudinal axis, said sprocket engaging said chain to reciprocate said longitudinal contacting member whereby slack in said chain provides a flexible connection between said contacting member reciprocating means and said contacting member to allow for higher tolerance levels between independently movable parts of said transfer mechanism.

2. A transfer mechanism for removing hot extruded products from a conveyor, said transfer mechanism comprising: a longitudinal work supporting member including a longitudinal refractory bar member adapted to support the hot extruded products thereon, said work supporting member being reciprocable along its length, a lifting member supporting said longitudinal work supporting member and on which said work supporting member reciprocates, a chain attached at end portions thereof to a bottom portion of said work supporting member, sprocket means beneath said work supporting member for engaging said chain to reciprocate said work supporting member, and roller bearing means between said work supporting member and said lifting member so that the work supporting member slides freely on the lifting member whereby slack in said chain provides a flexible connection between said sprocket means and said work supporting member to allow for high tolerance levels between independently movable parts of said transfer mechanism.

3. In an apparatus for removing elongated hot extruded products from a slatted conveyor system, said apparatus comprising a plurality of spaced parallel transfer mechanisms, each of said transfer mechanisms having a longitudinal contacting member reciprocable along its length, said contacting member having an upper longitudinal work supporting refractory member adapted to support said extruded products, a lifting member which supports said contacting member and on which the contacting member reciprocates, said lifting member being rotatable about a horizontal axis transverse to the longitudinal direction of the contacting member, means for reciprocating said longitudinal contacting member on said lifting member, and means for periodically raising one end of said lifting member, the improvement which comprises:

roller bearing means position between said longitudinal contacting member and said lifting member whereby the reciprocation of the contacting member is greatly facilitated;

said reciprocating means comprises a chain attached at end portions thereof to the bottom portion of said contacting member and disposed longitudinally thereof; and a powered sprocket attached to a shaft which is rotatable in either direction about its longitudinal axis whereby slack in said chain provides a flexible connection between said contacting member reciprocating means and said contacting member to allow for higher tolerance levels between independently movable parts of said transfer mechanism.

4. A transfer mechanism according to claim 3, wherein said roller bearing means are attached to the sides of said longitudinal contacting member at one end thereof and are positioned in spaced channel members of said lifting member on either side of said longitudinal contacting member.

5. A transfer mechanism according to claim 3, wherein said longitudinal contacting member comprises a graphite bar having sloping sides, a channel support for said graphite bar, said channel supports having upwardly and inwardly sloping side flanges adjacent said bar generally conforming to the shape of said bar at least at the bottom portion thereof.

6. A transfer mechanism according to claim 3, wherein said lifting member is seated on said sprocket shaft and is freely rotatable with respect to said sprocket shaft.

7. An apparatus according to claim 3 wherein each sprocket on each contacting member is powered by the same rotatable shaft.

8. In a transfer mechanism for removing hot extruded products from a conveyor system, said transfer mechanism comprising a longitudinal contacting member reciprocable along its length, said contacting member including a longitudinal work supporting member adapted to support said extruded products, a lifting member which supports said contacting member and on which said contacting member reciprocates, said lifting member being rotatable about a horizontal axis transverse to the longitudinal direction of said contacting member, means for reciprocating said longitudinal contacting member on said lifting member, and means for periodically raising one end of said lifting member, the improvement which comprises:

said longitudinal contacting member comprising a graphite bar having sloping sides, a channel support for said graphite bar, said channel support having upwardly and inwardly sloping side flanges adjacent said bar generally conforming to the shape of said bar at least at the bottom portion thereof;

said reciprocating means comprises a chain attached at end portions thereof to the bottom portions of said contacting member and disposed longitudinally thereof; and a sprocket attached to a shaft which is rotatable in either direction about the longitudinal axis, said sprocket engaging said chain to reciprocate said longitudinal contacting member whereby slack in said chain provides a flexible connection between said contacting member reciprocating means and said contacting member to allow for higher tolerance levels between independently movable parts of said transfer mechanism.

9. A transfer mechanism according to claim 8, wherein said graphite bar is of trapezoidal shape in lateral cross section.

References Cited

UNITED STATES PATENTS

| 943,591 | 12/1909 | Bosse | 214—32 |
|---|---|---|---|
| 1,597,536 | 8/1926 | Murray | 198—219 |
| 1,909,906 | 5/1933 | Smallwood | 198—219 |
| 2,954,863 | 10/1960 | Staples | 198—27 |
| 3,363,930 | 1/1968 | Webb | 294—118 |

FOREIGN PATENTS 679,920  9/1952  Great Britain.

RICHARD E. AEGERTER, Primary Examiner

U.S. Cl. X.R.

74—25; 198—219